United States Patent [19]

McCrea et al.

[11] 4,158,964
[45] Jun. 26, 1979

[54] METHOD AND APPARATUS FOR DETERMINING LIQUID LEVEL

[75] Inventors: Peter F. McCrea, Pawtucket, R.I.; James B. McGown, Attleboro, Mass.

[73] Assignee: The Foxboro Company, Foxboro, Mass.

[21] Appl. No.: 904,692

[22] Filed: May 10, 1978

[51] Int. Cl.² ............................................. G01F 23/00
[52] U.S. Cl. ................................................. 73/290 V
[58] Field of Search ................. 73/290 R, 290 V, 305, 73/306, 313, 314, 319, 320

[56] References Cited

U.S. PATENT DOCUMENTS

| | | | |
|---|---|---|---|
| 2,998,723 | 9/1961 | Smith et al. | 73/290 V |
| 3,010,318 | 11/1961 | Morgan | 73/290 V |
| 3,326,042 | 6/1967 | Ross et al. | 73/290 V |
| 3,372,592 | 3/1968 | Gravert | 73/290 V X |
| 3,678,750 | 7/1972 | DiNoia et al. | 73/313 |
| 4,056,979 | 11/1977 | Bongort et al. | 73/313 |

*Primary Examiner*—Donald Watkins
*Attorney, Agent, or Firm*—Anthony N. Fiore, Jr.

[57] ABSTRACT

An ultrasonic level measuring system is disclosed for determining by a time-ratioing technique the level of a liquid within a storage tank. An instrument sensor assembly, including a waveguide formed of a tensioned, ferromagnetic wire having a low thermoelastic coefficient is vertically supported within a storage tank containing a liquid. The waveguide is positioned to span both the tank liquid and vapor spaces. Two permanent magnets are positioned in close proximity to the waveguide at a known dimensional separation which defines the calibration span of the system. The waveguide and magnets are housed in a protective shield which acts as a process barrier and which is convoluted over a substantial portion of its length allowing the instrument sensor assembly to be easily transported and installed. A float, housing a permanent magnet, is positioned concentrically about the instrument sensor assembly to rise and fall with the liquid level.

An ultrasonic transducer is formed of a field coil wrapped about a section of permanently magnetized, magnetostrictive wire. The magnetostrictive wire is butt welded to the top end of the waveguide.

The field coil is excited by a current pulse introducing a torsional ultrasonic pulse into the waveguide. As the ultrasonic pulse passes each of the three magnets (i.e., the top, float and bottom magnets), a low level voltage pulse is generated across the waveguide. The voltage pulses are detected and amplified by sensing circuitry and coupled to a signal processing unit. The processing unit produces an output signal indicative of the liquid level by ratioing the time interval between the float and bottom magnets to the time interval between the top and bottom magnets. The resulting ratio is scaled by being multiplied by the known distance between the top and bottom magnets, (i.e., the calibration span) to produce a measure of the liquid level in the tank.

24 Claims, 10 Drawing Figures

METHOD AND APPARATUS FOR DETERMINING LIQUID LEVEL

BACKGROUND OF THE INVENTION

1. Field of the Invention

The present invention relates generally to liquid level measurement and, more particularly, to determining the level of a liquid volume within a container, such as a storage tank.

2. Description of the Prior Art

Various methods and apparatus for determining the level of a liquid volume within a storage tank have been known in the prior art. One technique, prevalent in the delivery of gasoline to service stations, is the use of a dip stick. Another technique calls for the use of a float riding on the surface of the liquid. The float is coupled to a spring or torque motor by means of a measurement indicator, such as a calibrated tape, extending downwardly from the top of the tank. The spring acts to counterbalance the weight of the float such that as the float rises or falls with the liquid level the calibrated tape indicates the liquid level. Both techniques are suited for their intended purpose. But, neither technique provide the continuous, high accuracy measurement required in today's industrial control applications, such as level control and custody transfer applications and, applications involving large tank farm management and accounting systems.

One prior art proposal for producing a continuous and accurate measurement is the capacitance liquid level indicator. In this proposal the sensor assembly extends along the complete length of the tank spanning both the vapor and liquid space portions of the tank. The sensor assembly includes two plates and a center electrode. The two plates act as the two plate electrodes of a capacitor. The liquid being measured is used as the dielectric and is allowed to flow between the sensor plates. The capacitance between the plates varies as the liquid level fluctuates. The capacitance variations are sensed by the center electrode and converted to an electrical current, perferrably 4-20 ma. Although this technique is accurate, it has several disadvantages. Since the liquid is used as the dielectric, it must be nonconductive. Also, if the viscosity of the liquid is too high, clogging develops between the sensor plates requiring time consuming cleaning. Capacitance level indicators are also relatively expensive.

Other proposals call for the use of ultrasonic techniques. Ultrasonic level measurement techniques have been proposed in many forms by the prior art. Earlier systems called for placing an ultrasonic transceiver at the top of the tank and transmitting an ultrasonic pulse of short duration towards the liquid. The pulse is reflected back towards the transceiver by the acoustic impedance discontinuity at the vapor/liquid interface. The time duration between transmission and reception of the sonic pulse is a measure of the liquid level. Other known ultrasonic approaches call for the use of a waveguide or transmission line made of a material having temperature characteristics that are preselected to maintain the velocity of the ultrasonic pulse as constant as possible over a predetermined temperature range.

One such prior art approach calls for connecting a mode converter to one end of a ferromagnetic waveguide. The waveguide is placed to span both the vapor and liquid spaces in a container. A float, moveable with the liquid level, is placed about the waveguide and houses a permanent magnet. Circuitry is provided for transmitting a current pulse along the waveguide. The magnetic field associated with the current pulse as it propagates along the waveguide interacts with the magnetic field of the permanent magnet producing bi-directional sonic torsional pulses. One of the sonic pulses is transmitted back along the waveguide to the mode converter, the other is damped at the opposite end of the waveguide. The time between the initial transmission of the current pulse until the reception of the sonic pulse by the mode converter is a measure of the liquid level in the container. While this device performs satisfactorily, it is not without significant drawbacks. Since the velocity of an ultrasonic pulse varies directly with changes in the temperature and homogeneity of the medium in which it is propagating, errors are introduced into the system. Also, assuming that the material of the waveguide has a thermoelastic coefficient of 10-20 ppm, there is an error introduced due to temperature. This error directly effects the accuracy of the reading and, is dramatically exhibited in large tank custody transfer applications where a measurement accuracy of approximately ¼ inch in sixty feet may be required.

Additionally, the value of the current pulse transmitted along the waveguide may be in the order of half an ampere, causing severe product safety problems if the system is to be used in applications involving flammable liquids. Also, the waveguide is rigid, hindering its ability to be easily transported and installed.

As can be seen, ultrasonic level measurement systems according to the prior art are directly effected by the temperature and homogeneity of the propagation medium. They also have disadvantages in the area of flexibility in the type of liquids in which they are useable due to product safety and other requirements and, have transportation and installation problems due to the rigidity of the sensing elements when used in large tank applications.

SUMMARY OF THE INVENTION

In accordance with one aspect of the present invention there is provided a method of measuring the liquid level in a storage tank in a differential manner (i.e., a ratio) producing a level measurement less susceptible to environmental variations of temperature and homogeneity within the tank. In the specific illustrated embodiment, the level of a liquid within a storage tank is measured by an apparatus including means to: (a) introduce an ultrasonic pulse into a ferromagnetic waveguide which is vertically supported to span the vapor/liquid interface within such tank; and, (b) produce a series of three time related pulses by sensing the voltage generated across the waveguide by the propagation of the pulse past each of a first, second and third datum points which are defined by the position of the respective magnets situated along the waveguide. Wherein, the first datum point is a tank top reference, the second datum point is at the liquid level by placing the second magnet in a float riding on the liquid surface and, the third datum is a tank bottom reference. Said method further includes means to process the three time-related pulses to produce the ratio ($T_{FB}/T_{TB}$), where $T_{FB}$ is the float to bottom propagation time of the ultrasonic pulse and, $T_{TB}$ is the top to bottom propagation time.

Therefore, it is an object of the present invention to provide improved methods and apparatus for determining the liquid level within a storage tank. Other objects, aspects and advantages of the invention will be pointed out in, or apparent from the following detailed description of a preferred embodiment, considered together with the accompanying drawings.

In order that the invention may be throughly understood and readily carried into effect, the same will now be discussed more fully, by way of example only, with reference to the accompanying drawings.

DESCRIPTION OF THE PREFERRED EMBODIMENT

Figure 1:
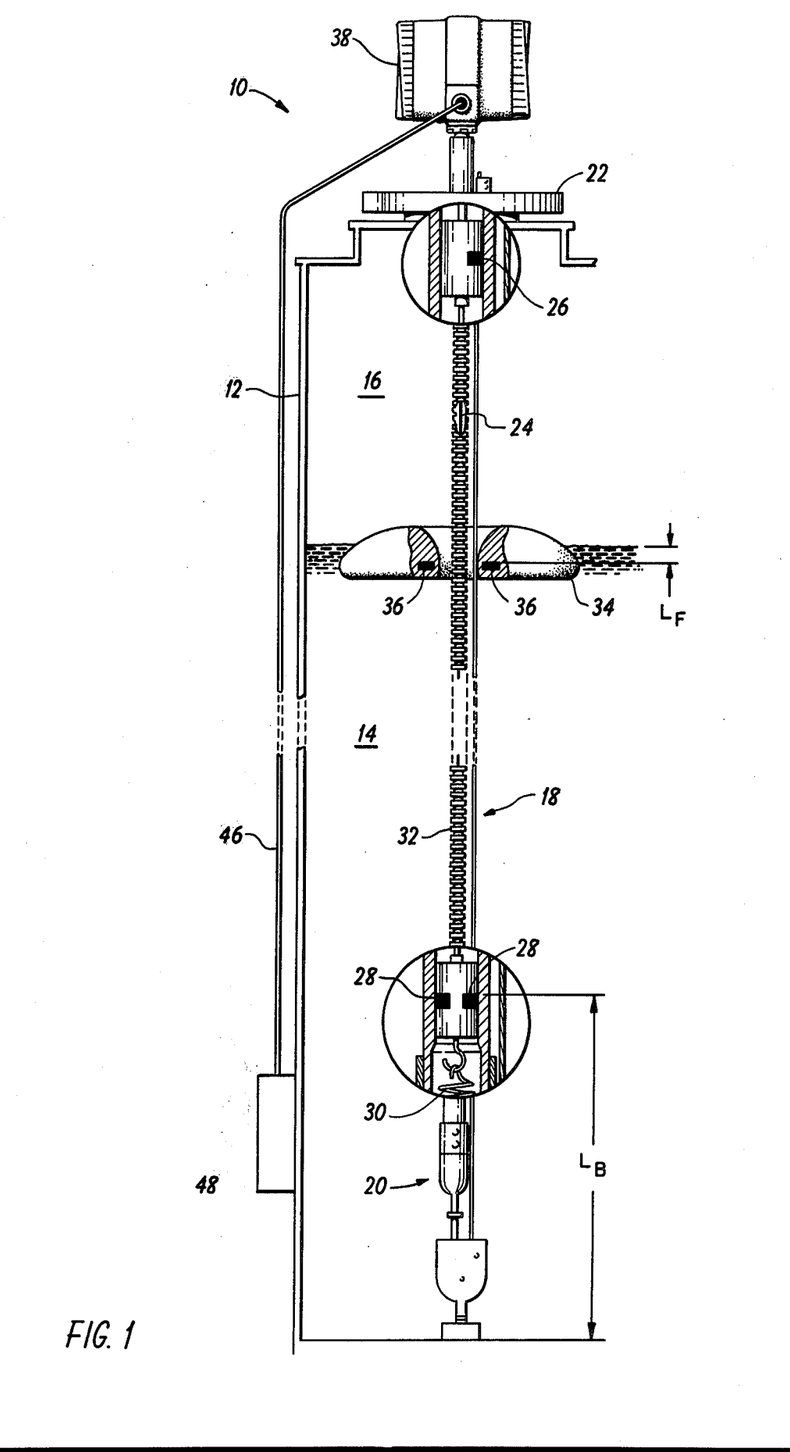
FIG. 1 shows a tank gauging system embodying the present invention.
Figure 2A:
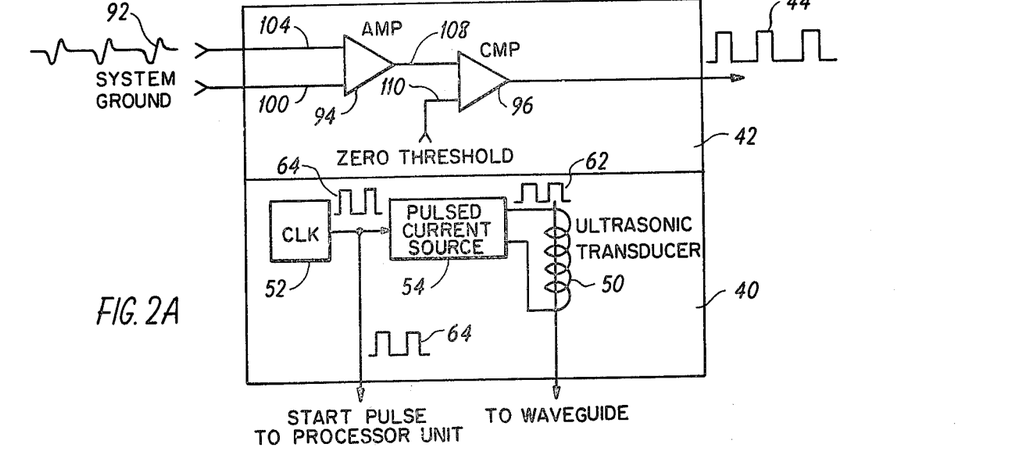
FIG. 2A shows, in schematic form, the topworks electronics.

Referring now to the drawings, FIGS. 1 and 2A illustrate a tank gauging system 10 embodying the present invention. A storage tank 12 contains a liquid volume 14, the level of which is to be measured and, a vapor space 16. An instrument sensor assembly 18 vertically spans the vapor/liquid interface, and is supported by means of a pulley assembly 20 and a mounting flange 22. The sensor assembly 18 includes a ferromagnetic waveguide 24, a top magnet 26, bottom magnets 28 and a spring 30, all housed within a protective shield 32. The magnets 26 and 28 are permanent magnets. A float 34, containing a permanent magnet 36, is concentrically positioned about the sensor assembly 18 to rise and fall with the liquid level.

A top-works assembly 38 is supported in a fixed position, at the top outside of the tank 12 by the flange 22. As shown schematically in FIG. 2A, the topworks 38 houses an ultrasonic pulse generator 40 and a sensing circuit 42. The sensing circuit 42 produces a series of three time related pulses 44, the time ratio of which is a measure of the level of liquid 14. The pulses 44 are transmitted by means of a cable 46 to a signal processing unit 48 which produces output signals indicative of the liquid level. The output signals may be in engineering units or as a percentage of the calibration span. The output signals may be coupled to a display means, such as an LED display, as part of the signal processing unit 48, to a CRT in a control room for viewing by an operator or, may be coupled to a computer as part of a process control loop.

As illustrated schematically in FIG. 2A, the topworks 38 houses the generator 40 and the sensing circuitry 42. The generator 40 includes an ultrasonic transducer 50, a clock 52 and a pulse current source 54.

Figure 3:
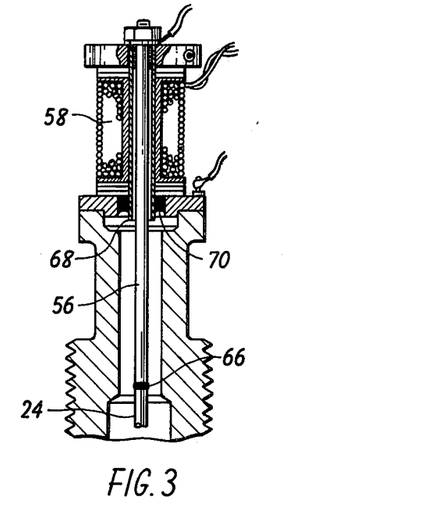
FIG. 3 illustrates the coupling of the field coil about the transducer wire.
Figure 4:
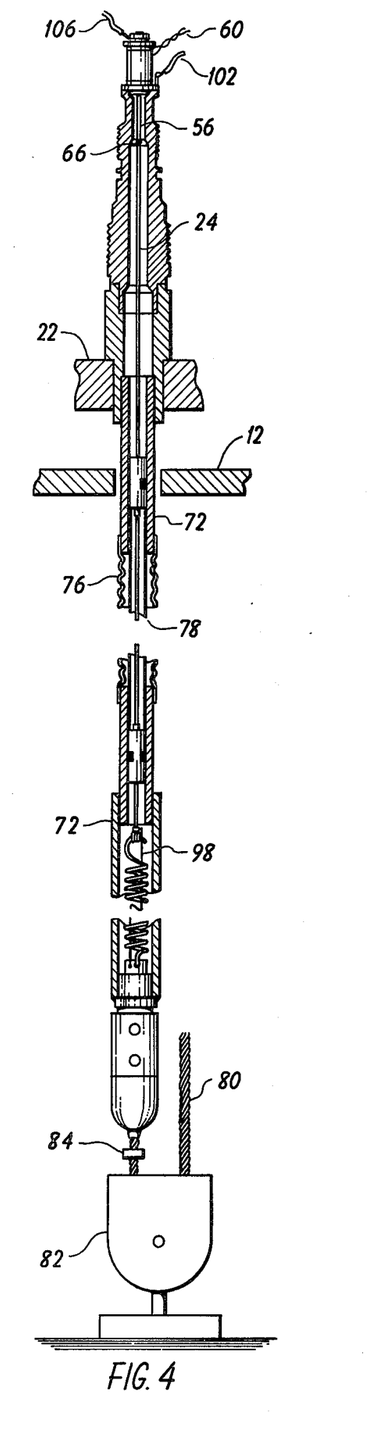
FIG. 4 illustrates the instrument sensor assembly.

As shown in FIGS. 3 and 4, the transducer 50 includes a section of magnetostrictive wire 56 and a field coil 58. The wire 56 is permanently magnetized with a circumferential magnetic polarization prior to installation into the topworks 38. It has been found that the wire made of materials having high coercive force, operate successfully. One such material is Remendur 48 which is manufactured by the Wilbur B. Driver Company. Remendur 48 is an Iron, Cobalt, Vanadium and Manganese alloy which has been highly cold worked and heat treated.

The field coil 58 is wrapped about the wire 56, as shown in FIG. 3. The field coil 58 is made of 150 turns of number 27, copper wire, and is coupled to the pulsed current source 54 by means of a pair of twisted wires 60, as shown in FIG. 4. The pulsed current source 54 provides a train of current pulses 62 for driving the coil 58 in response to the clock 52. When the coil 58 is excited by a current pulse, a magnetic solenoid field is developed about the wire 56. The resulting solenoid field is aligned with the longitudinal axis of the wire 56. The axially aligned solenoid field interacts with the circumferential field in the wire 56, producing a torsional ultrasonic pulse in the wire 56, according to the Wiedemann Effect.

This phenomenon is described in the article "Joule and Weidemann Effects—The Simultaneous Generation of the Longitudinal and Torsional Stress Pulses in Magnetostrictive Materials" by N. S. Tzannes, in the July, 1966 ISEE Transactions on Sonic and Ultrasonics, Vol. SU-13, No. 2.

The clock 52 produces start pulses 64 at a convenient frequency, such as 60 Hz. The start pulses 64 are also coupled to the signal processing unit 48 to initialize that unit for its operation, which will be discussed further herein. The current source 54 may also be excited by a manual operation, such as a switch closure, initiated by an operator.

As shown in FIGS. 1, 4, 5A and 5B, the instrument sensor assembly 18 includes the ferromagnetic waveguide wire 24, the top magnet 26, the bottom magnets 28 and the spring 30, all enclosed in the protective shield 32. The wire 24 provides as a medium of propagation for the torsional ultrasonic pulse. The top magnet 26 and bottom magnets 28 are permanent magnets and, are aligned to be adjacent to the waveguide 24.

The waveguide wire 24 is connected to the transducer wire 56 by means of a butt weld 66. In this manner, a torsional ultrasonic pulse generated in the transducer wire 56 is coupled and propagates along the waveguide wire 24. It should be noted that the butt weld 66 should be made as clean as possible to avoid an excessive impedance discontinuity at the weld interface.

For product safety and performance reasons, it is desirable to environmentally isolate the topworks assembly 38 from the tank 12. For this purpose, the transducer wire 56 is axially aligned within a stainless steel, tubular housing 68 which passes from the topworks 38 into the tank 12 through a glass compression seal 70. The housing 68 acts as an environmental isolator. The seal 70 provides electrical isolation. Thus, if the protective shield 32 is damaged, the environment of the tank 12 will remain isolated from the topworks 38.

Since the variations in the temperature within the tank 12 directly effect the velocity of the ultrasonic pulse as it propagates in the waveguide 24, the waveguide 24 is made of a homogeneous alloy having a low thermoelastic coefficient. The wire 24 is preferably made of Ni-Span C. Ni-Span C is an Iron, Nickel, Chromium alloy which has been cold worked and heat treated and, which may be purchased from the Huntington Alloys.

The spring 30 is connected to the waveguide 24 and the pulley assembly 20. The spring 30 functions to supply tension to the waveguide 24 to maintain it in a verticle position within the tank 12.

As shown in FIG. 1, the sensor assembly 18 includes the top magnet 26 and the bottom magnets 28. The distance between magnets 26, and 28 defines the calibration span of the system 10. The measurement span of the system 10 then extends from a point slightly below the top magnet 26, to a point slightly above the bottom magnets 28. Other positions of the magnets 26, 28 may be chosen to vary the values of the calibration and measurement span.

Figure 5A:
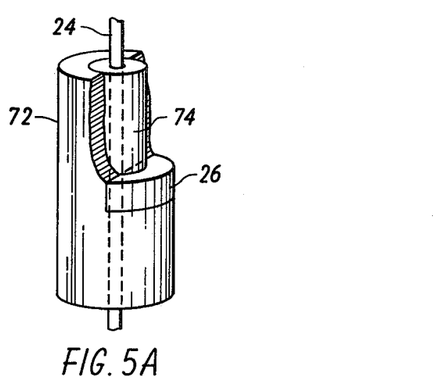
FIG. 5A illustrates the top magnet assembly.
Figure 5B:
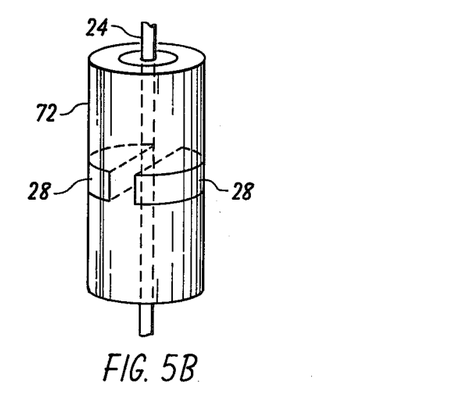
FIG. 5B illustrates the bottom magnet assembly.

The magnets 26 and 28, as shown in FIGS. 5A and 5B, respectively, are in the form of half-discs and are housed in the rigid portions 72 of the protective shield 32 into which the waveguide 24 extends. The waveguide 24 is electrically isolated from the rigid portion 72 of the shield 32 by an insulation tube 74 such as, silicone tubing.

As shown in FIG. 4, the waveguide 24, magnets 26, 28 and its spring 30 are all enclosed in the protective shield 32 which basically comprises a thin-walled, convoluted stainless steel tube 76. Since the height of the instrument sensor assembly 18 is generally equal to the tank height, which may be 40–60 feet, a rigid sensor assembly is difficult to transport and install. For this reason, the convolutional portion of the protective shield 32 is provided so the instrument sensor assembly 18 may be coiled for ease of transportation and installation.

A silicone liner 78 is provided in the inside of the shield 32 to electrically isolate the waveguide 24 from the shield 32, as well as to provide a low acoustical attenuating boundary should the wire 24 contact the inside wall of the shield 32.

As shown in FIG. 1, the instrument sensor assembly 18 is vertically supported within the tank 12 by the pulley assembly 20 and the flange 22. The flange 22 is preferably a two inch, 150 lb. blind flange made of stainless steel.

The pulley assembly 20 includes a support cable 80 and a pulley housing 82 and, acts to supply tension to the protective shield 32 to maintain its position vertical within the tank 12. An adjustable tension stop 84 is provided to allow for variation in the tension supplied.

Figure 6A:
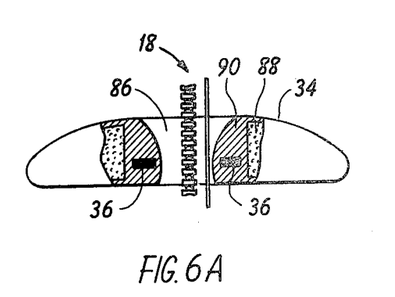
FIG. 6A illustrates a side, cut-away view of the float.

As shown in FIGS. 1 and 6A, the float 34, containing the permanent ring magnet 36, is concentrically positioned about the sensor assembly 18, without direct mechanical connections by means of an aperture 86. The aperture 86 is contoured to facilitate the movements of the float 34 along the sensor assembly 18 as the liquid level varies. The float 34 is formed in a donut-shape to reduce the effects of wave motion on the position of the float magnet 36 and, to maximize the length of a static electric discharge path in the vapor space 16.

The float 34 is made of a syntactic foam construction. A core 88 is made of a foamed urethane, and is surrounded by a dense shell 90 formed of a mixture of epoxy resin with minature glass balloons. The float is designed to have a specific gravity such that the float magnet 36 is positioned at or near the liquid level. As shown in FIG. 1, the magnet 36 is positioned at a distance $L_F$ from the vapor liquid interface.

Figure 6B:
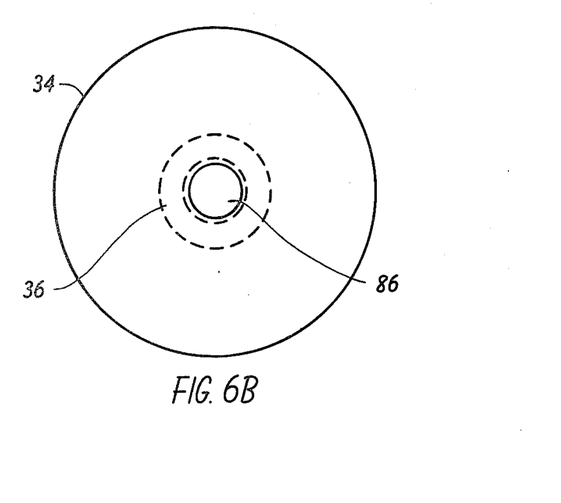
FIG. 6B illustrates a top view of the float.

As shown in FIG. 6B, the ring magnet 36 is potted within the epoxy shell 90 such that when the float 34 is placed about the sensor assembly 18, the magnet 36 is positioned concentrically about the sensor assembly 18. Preferably, the magnet 36 is made of INDOX I, a sintered ceramic material, manufactured by Indiana General. The float magnet 36 is radially polarized and is positioned to have its south pole at its inside diameter and therefore adjacent to the sensor assembly.

In operation, the field coil 58 produces a torsional ultrasonic pulse in the ferromagnetic waveguide wire 24. The pulse propagates along the waveguide 24 towards the magnets 26, 36, and 28, respectively. As the pulse passes by each of the magnets 24, 36, and 28, a low level, bipolar voltage pulse 92 in the order of 500 microvolts peak to peak, is generated across the waveguide wire 24. This phenomenon is known as the Matteucci Effect, and is discussed in the article, "Matteucci Effect: Its Interpretation and Its Use for the Study of Ferromagnetic Matter", by Roman Skorski, published in the Journal of Applied Physics, Volume 35, Number 4, April 1964.

Figure 2B:
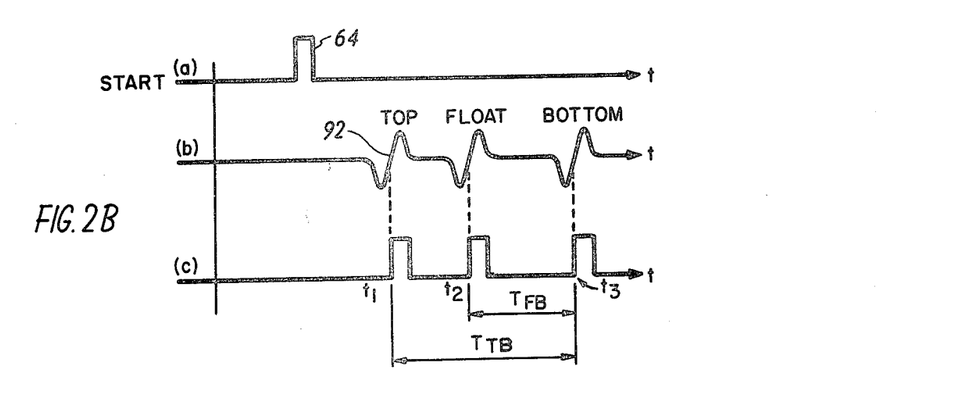
FIG. 2B shows various electrical waveforms of the present invention.

The pulses 92 are shown in FIG. 2A, line b, and are sensed by the sensing circuit 42 producing the time-related sequence of three digital pulses 44, as shown in FIG. 2B, line c. The time relationship between the pulses 44, as will be herein further discussed, is a measure of the liquid level.

Since the propagation of the ultrasonic pulse in the waveguide 24 is a surface phenomenon, the amplitude of the voltage pulses 92 varies directly with the cross-sectional diameter of the waveguide 14. For this reason, a cross-sectional diameter of 0.050 inches is preferred for the waveguide 24.

The magnets 26 and 28 are positioned relative to the waveguide 24 such that only one of their magnetic poles is adjacent to the waveguide 24. In this position, it has been found, the magnetic fields of the magnets 26, 28 are aligned with the waveguide 24 such that the pulses 90 are produced in a definite manner. In the illustrated embodiment, it is the south pole of the magnets of 26 and 28 which is positioned adjacent to the waveguide 24.

The sensing circuitry 42, illustrated schematically in FIG. 2A, includes an amplifier 94 and a comparator 96. The amplifier 94 is connected in parallel with the waveguide 24 to sense and amplify the low amplitude pulses 92 developed across the waveguide 24 as the ultrasonic pulse propagates past the top, float and bottom magnets 24, 36, 28 respectively. In this manner, the waveguide 24 is part of the sensing electronics of the system 10. Since the spring 30 is connected in series with the waveguide 24, it also is part of the sensing electronics. Also, since the impedance of the spring 30 varies with tension (i.e., as the spring contracts or relaxes), a shunt wire 98 is provided in parallel with the spring 30 to shunt the impedance variations, thus maintaining an effective constant spring impedance with tension.

To connect the amplifier 94 in parallel with the waveguide 24, one input 100 is electrically connected to terminal 102. The terminal 102 is electrically connected to system ground and, is electrically connected to the bottom end of the waveguide 24 by means of the protective shield 32. The other input 104 of the amplifier 94 is electrically connected to the transducer wire 56 and, due to the butt weld 66, is electrically connected to the waveguide 24.

The comparator 96 is connected for differential operation. One input 108 of the comparator is connected to the output of the amplifier 94 for receiving the amplified voltage pulses. Since the voltage pulses 92 generated across the waveguide 24 by the passage of ultrasonic pulse by the magnets 26, 36, and 28, are bipolar, the other input 110 of the comparator 96 is connected to a zero-crossing reference. In this manner, the comparator 96 is used as a zero-crossing detector. The comparator 96 produces the three time-related pulses 44 as an output signal. The three pulses 44 are transmitted to the signal processing unit 48 via the cable 46.

The processor unit 48 produces a pair of output signals 112 and 114 which is a measure of the level of the liquid 16. The output 112 represents the liquid level as a percentage of span, while output 114 is a measure of level in engineering units.

Before discussing the operational circuitry of the signal processing unit 48, a discussion of the time-ratioing technique of the present invention will now be presented.

Referring to FIG. 2A, let $t_1$ equal the time at which the ultrasonic pulse propagates past the top magnet 26, $t_2$ equal the time the pulse propagated past the float magnet 36 and, $t_3$ equal the time the pulse propagated past the bottom magnet 28. Then $t_2-t_3$ represents the time for the pulse to propagate between the float magnet 36 and the bottom magnet 28. This time is designed $T_{FB}$. In like manner $t_3-t_1$, represents the time of flight from the top magnet 26 to the bottom magnet 28, a known distance (i.e., the time to travel the calibration span). This time is referred to as $T_{TB}$. Thus if:

$$L_{FB} = T_{FB} \times C_{FB} \quad (1)$$
$L_{FB}$ = float to bottom length
$C_{FB}$ = float to bottom propagation rate and
$$T_{TB} = \frac{L_{TB}}{C_{TB}} \quad (2)$$
$L_{TB}$ = length top to bottom
$C_{TB}$ = top to bottom propagation rate Then, assuming that $C_{TB}=C_{FB}$, (i.e., assuming a constant propagation rate of the pulse throughout the wire) then:

$$C_{TB} = \frac{L_{TB}}{T_{TB}}, \text{ from equation (2)} \quad (3)$$

and substituting equation 3 into equation 1:

$$L_{FB} = \frac{T_{FB}}{T_{TB}} \times L_{TB} \quad (4)$$

Under these conditions the length float to bottom ($L_{FB}$), which is the liquid level, is a function of the ratio of time. That is, the time-ratioing technique of the present invention provides a measure of liquid level which is independent of the velocity of the ultrasonic pulse.

The measurement $L_{FB}$ as defined in Equation 4 is an accurate measure of the liquid level in the tank 12 if the bottom magnets 28 are coplanar with the bottom of the tank 12 and, the float magnet 36 is coplanar with the liquid level. This is generally not the case. As shown in FIG. 1, the bottom magnets 28 are a distance $L_B$ from the bottom of the tank 12 and, the float magnet 36 is a distance $L_F$ from the water line. Thus, the liquid level, LL, is:

$$LL = \frac{T_{FB}}{T_{TB}} \times L_{TB} + L_B + L_F \quad (5)$$

where $L_B$ and $L_F$ are the zero and float offsets, respectively.

Figure 7:
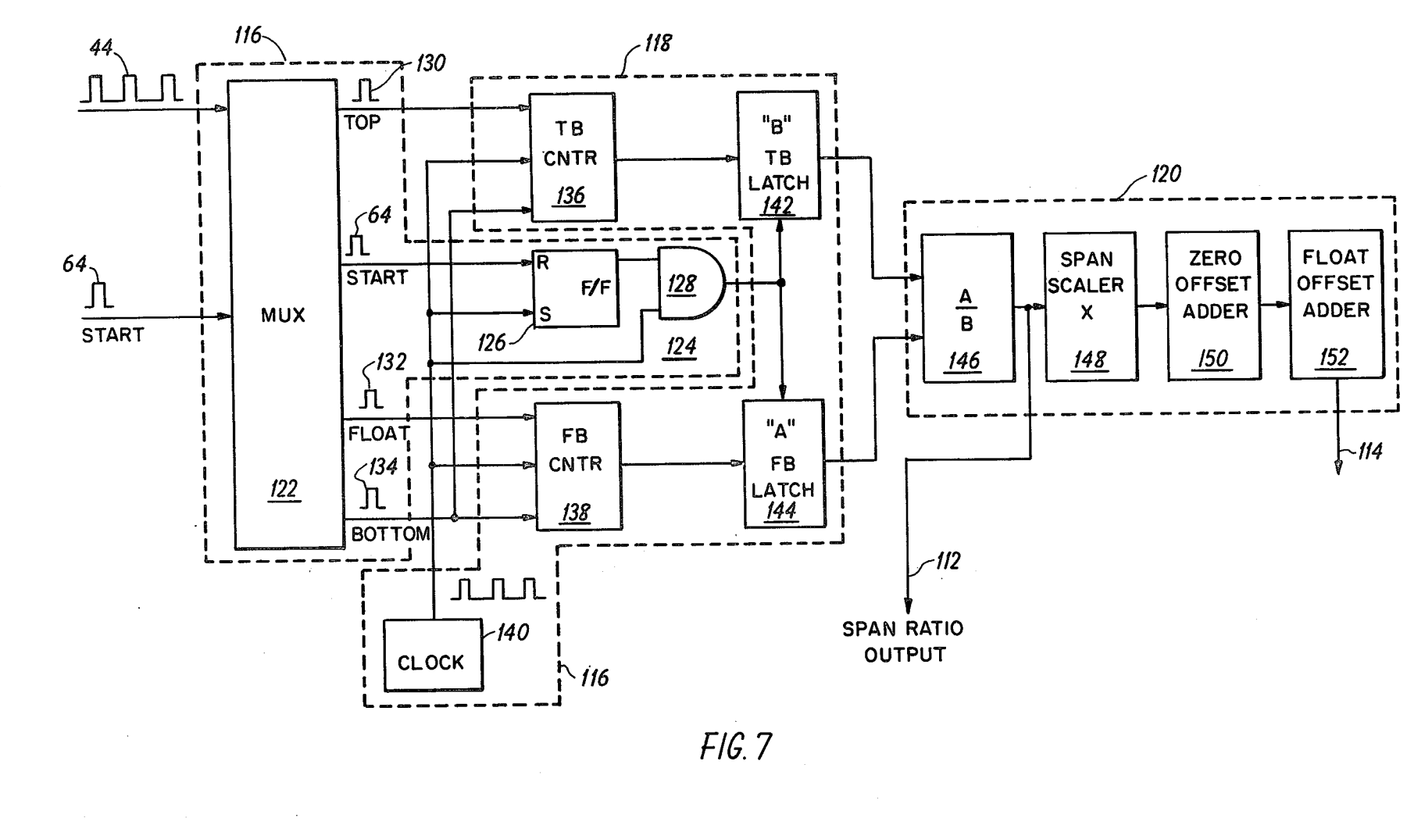
FIG. 7 illustrates, in block form, the signal processing unit electronics.

Circuitry to provide an output signal which is a ratio of two time measurements is well known in the electronics art. A variety of devices are available to perform the ratioing function. Thus the signal processing unit 48, shown in block form in FIG. 7, is by way of example only. The unit 48 includes input circuitry 116, timing circuitry 118 and, arithmatic circuitry 120.

The input circuitry 116 includes a multiplexer 122 and an initializer circuit 124. The multiplexer 122 receives the start pulses 64 and the pulses 44. The start pulses 64 are passed directly through the multiplexer 122 to the initializer 124. The initializer 124 includes a flip-flop (F/F) 126 and, an AND gate 128. The start pulse "resets" in F/F 126, disabling the gate 128.

The multiplexer 122 strips each of the pulses 44 from the chain and produces, on separate lines, a top pulse 130, a float pulse 132, and a bottom pulse 134. The pulses 130, 132 and 134 are coupled to the timing circuit 118.

The timing circuit 118 includes a top to bottom (TB) counter 136 and a float to bottom (FB) counter 138. Both counters 136, 138 are coupled to a timing clock 140. The output signal frequency of the timing clock 140 is variable, and depends upon the desired resolution. It should be noted that the accuracy band of the clock 140 is relatively wide due to the time-ratioing technique of the present invention.

In operation, upon generation of the top signal 130, (i.e., when the ultrasonic pulse passes by the top magnet 26) the TB counter 136 is enabled and starts to count clock pulses. Some time later, as shown in FIG. 2A, the float pulse 132 is generated enabling the FB counter 138, which starts counting clock pulses. Then after a second time interval, a bottom pulse 134 is generated disabling the counters 136 and 138 and "sets" the F/F 126 thus, enabling AND gate 128. At this point counter 136 contains the time it took the ultrasonic pulse to propagate from the top magnet 26 to the bottom magnets 28. That is, for the pulse to travel a known distance, which is the system calibration span. Counter 138 contains the float to bottom time of travel. On the next clock pulse, the data in counters 136 and 138 is transferred to the latches 142 and 144, respectively. The output of the latches 142, 144 are connected to the arithmatic circuit 120.

The arithmatic unit 120 includes a ratio circuit 146, a span multiplier/circuit 148, a zero offset adder circuit 150, and, a float offset adder circuit 152. The arithmatic circuitry 120 uses the data in latches 142 and 144 to solve equation 5.

The ratio circuit 146 produces a ratio of the data in latch 142 ($T_{TB}$) to the data in latch 144 ($T_{FB}$) producing an output signal 112 equal to ($T_{FB}/T_{TB}$). The output signal 112 is a measure of the level of liquid 16 as a percentage of calibration span. The signal 112 is then multiplied by the system calibration span in multiplier 148. The output of multiplier 148 is coupled to the adder circuit 150.

In circuits 150 and 152, the offsets due to the distances $L_B$ and $L_F$ are added to the output of circuit 148, respectively. The circuit 152 produces an output signal 114 which is a measure of liquid level taking into account the system offsets $L_B$ and $L_F$, thus in engineering units.

The output signal 112 and/or the output signal 114 may be transmitted to a CRT or other display device in an operation control room of an industrial control system or, to a computer for use in a process control loop.

Also, large farms of tanks 12 each having a tank gauging system 10 of the present invention may be tied together and the respective output signals 112, and/or 114 may be coupled to a computer for use in management and accounting systems for tank farms.

While only a single embodiment of the invention has been illustrated and described in detail, the invention is not to be considered limited to the precise construction shown. Various adaptations, modifications and uses of the invention may occur to those skilled in the art to which the invention pertains and the intention is to cover all such adaptations, modifications and uses which fall within the spirit and scope of the appended claims.

I claim:

1. An apparatus for measuring the level of liquid in a tank comprising:
   (a) an elongate ferromagnetic element adapted to be mounted vertically within the tank;
   (b) means for applying to one end of said element an ultrasonic pulse which propagates through said element;
   (c) at least first and second magnet means adjacent said element, one above the other, each of said magnet means being responsive to the passing of said ultrasonic pulse to produce corresponding first and second electrical pulses in said element;
   (d) means for mounting said first magnet means fixed in position;
   (e) a float supportable by the surface of said liquid and carrying said second magnet means, whereby the vertical position of said second magnet means corresponds to the level of said liquid;
   (f) electrical signal sensing means coupled to said element to receive said electrical pulses; and
   (g) timing means coupled to said sensing means to produce an output signal responsive to the time period between said first and second electrical pulses.

2. An apparatus as in claim 1, including shield means surrounding said elongate element to provide isolation therefore; said shield means comprising in a major portion thereof a thin-walled flexible segment adapted to be coiled so as to accomodate transportation to the tank and ready installation therein.

3. An apparatus as in claim 1, wherein said applying means comprises:
   (a) a pulse-generating section integral with the upper end of said element;
   (b) coil means surrounding said pulse-generating section and arranged to produce a magnetic field therein in response to the application of an electrical current to said coil means; and,
   (c) environmental isolation means surrounding said pulse-generating section and said element.

4. An apparatus for measuring the level of liquid in a tank comprising:
   (a) an elongate ferromagnetic element adapted to be mounted vertically within the tank;
   (b) means for applying to one end of said element an ultrasonic pulse which propagates through said element;
   (c) first, second and third magnet means adjacent said element and responsive to the passing of said ultrasonic pulse to produce corresponding first, second and third electrical pulses in said element;
   (d) means for mounting said first and third magnet means fixed in position one above the other;
   (e) a float supportable by the surface of said liquid between said first and third magnet means and carrying said second magnet means, whereby the vertical position of said second magnet means corresponds to the level of said liquid;
   (f) electrical signal sensing means coupled to said element to receive said electrical pulses; and,
   (g) timing means coupled to said sensing means to produce an output signal responsive to the ratio of: (1) the time period between said second and third electrical pulses, and (2) the time period between said first and third electrical pulses.

5. An instrument for determining the level of liquid within a storage tank, comprising:
   (a) a ferromagnetic transmission medium adapted to be supported within such tank to span the vapor/liquid interface;
   (b) a first element adjacent said medium for generating a magnetic field about a first reference point along the transmission medium, said first point defining the maximum measurement level;
   (c) a second element adjacent said medium for generating a magnetic field about a second reference point along the transmission medium, said second point defining the minimum measurement level;
   (d) a third element interdisposed of the first and second elements and moveable with the liquid level, said third element for generating a magnetic field about a point on the transmission medium substantially at the liquid level;
   (e) means for generating a torsional ultrasonic pulse, said means being coupled to the transmission medium such that such ultrasonic pulse is introduced to the medium;
   (f) wherein the distance between the first and second elements is fixed at a predetermined dimension and, as said ultrasonic pulse passes each of said first, second and third points a respective voltage pulse is generated across the transmission medium;
   (g) sensing circuitry coupled in parallel with the transmission medium for sensing each of said generated voltage pulses; and,
   (h) wherein the time-ratio of the three generated pulses is a measure of the liquid level.

6. The instrument according to claim 5 wherein said ferromagnetic transmission medium is a waveguide made of ferromagnetic wire.

7. The instrument according to claim 6 wherein said ferromagntic wire is made from a material having a low thermal elastic coefficient.

8. The instrument according to claim 7 wherein said ferromagnetic wire is made of Ni-Span C.

9. The instrument according to claim 5 wherein said first and third sensing elements are permanent magnets.

10. The instrument according to claim 5 wherein said first and third sensing element are rare earth magnets.

11. The instrument according to claim 5 wherein said second sensing element is a magnet.

12. The instrument according to claim 5 wherein said means for generating a torsional ultrasonic pulse comprises:
   (a) a section of magnetostrictive wire having a permanent, circumferential, magnetic polarization;
   (b) a field coil wrapped about said magnetostrictive wire;
   (c) a current source coupled to said field coil, said current source for exciting said coil by electrical current producing a magnetic field aligned with the axial direction of said magnetostrictive wire; and, (d) wherein said axially aligned field interacts with said circumferential field producing a pulsed torsional ultrasonic pulse in the magnetostrictive wire.

13. The instrument according to claim 12 wherein said magnetostrictive wire is made of a material having a high coercive force.

14. The instrument according to claim 13 wherein said magnetostrictive wire is made of Remendur.

15. The instrument according to claim 5 wherein time-ratio of said three generated pulses is the ratio of the time between the second and third pulses, to the time between the first and third pulses.

16. A system for determining the level of liquid within a storage tank, comprising:
  (a) a section of ferromagnetic wire adapted to be supported vertically within such tank to span the vapor/liquid interface, said ferromagnetic wire made of a material having a low thermoelastic coefficient;
  (b) an ultrasonic pulse generator for applying to the upper end of said ferromagnetic wire a torsional ultrasonic pulse which propagates downwards through said ferromagnetic wire, said pulse generator including:
    (I) a section of magnetostrictive wire coupled to the upper end of said ferromagnetic wire, said magnetostrictive wire having a permanent, circumferential, magnetic polarization;
    (II) a field coil wrapped about said magnetostrictive wire;
    (III) a current source coupled to said field coil, said current source for exciting said coil with a current pulse producing an axially aligned magnetic field about the magnetostrictive wire; and,
    (IV) wherein said axially aligned field interacts with said circumferential field to produce a pulsed torsional ultrasonic pulse in said ferromagnetic wire;
  (c) first, second and third permanent magnets mounted one above the other and adjacent to the ferromagnetic wire, each of said magnets responsive to the passing of said ultrasonic pulse to produce respective first, second and third electrical pulses in said ferromagnetic wire;
  (d) a float supportable by the surface of such liquid between said first and third magnets and carrying said second magnet such that the vertical position of said second magnet corresponds to substantially the level of such liquid; and,
  (e) sensing circuitry coupled in parallel with said ferromagnetic wire for sensing the presence of said electrical pulses, said sensing circuitry producing first, second and third digital signals which characterize the first, second and third electrical signals respectively and the time ratio of which is a measure of liquid level.

17. The system according to claim 16 further including a signal processing unit coupled to said sensing circuitry to produce an output signal responsive to the ratio of: (1) the time period between the second and third digital pulse and (2) the first and third digital pulses.

18. The system according to claim 16 further including a protective shield surrounding said ferromagnetic coil and acting as a process barrier, said shield comprising in a major portion thereof a thin-walled, convoluted segment adapted to the coil so as to accomodate transportation and installation.

19. The system according to claim 16 wherein said ferromagnetic wire is made of Ni-Span C.

20. The system according to claim 16 wherein said first and third magnets are rare earth magnets.

21. A method of determining the level of liquid within a tank, comprising:
  (a) introducing a torsional ultrasonic pulse into a ferromagnetic waveguide adapted to be supported vertically within such tank;
  (b) sensing the propagation of said ultrasonic pulse by a first, second and third datum points to produce a series of three time-related pulses the ratio of which is a measure of the level of such liquid, said datum points being defined by respective first, second and third magnets means situated along said waveguide; and,
  (c) wherein said first datum point is a tank top reference, said second datum point is a level reference and is movable with the liquid surface and, such third datum point is a tank bottom reference.

22. The method according to claim 21 further including the steps of processing the three time-related pulses to produce the ratio (1) the time period between the second and third pulses (2) the time period between the first and third pulses.

23. The method according to claim 21 further including the step of surrounding said waveguide with a shield means comprising in a major portion thereof a thin-walled, flexible segment adapted to be coiled so as to accomodate transportation to the tank and ready installation therein.

24. The method according to claim 21 wherein the step of introducing a torsional ultrasonic pulse into said waveguide comprises:
  (a) generating a pulsed magnetic field about a section of magnetostrictive wire having a permanent, circumferential magnetic polarization and coupled to said waveguide such that said pulsed field is aligned with the longitudinal direction of said wire; and
  (b) wherein said pulsed longitudinal field interacts with said circumferential field to produce a torsional ultrasonic pulse in said waveguide.

* * * * *